United States Patent
Hua et al.

(10) Patent No.: US 11,483,954 B2
(45) Date of Patent: Nov. 1, 2022

(54) SHOVEL HANDLE CONNECTING DEVICE

(71) Applicant: CiXi HuaJie Plastic Product Co., Ltd., Cixi (CN)

(72) Inventors: Jie Hua, Cixi (CN); Shimin Hua, Cixi (CN)

(73) Assignee: CiXi HuaJie Plastic Product Co., Ltd., Cixi (CN)

( * ) Notice: Subject to any disclaimer, the term of this patent is extended or adjusted under 35 U.S.C. 154(b) by 32 days.

(21) Appl. No.: 17/052,471

(22) PCT Filed: Jul. 24, 2019

(86) PCT No.: PCT/CN2019/097462
§ 371 (c)(1),
(2) Date: Nov. 2, 2020

(87) PCT Pub. No.: WO2020/237807
PCT Pub. Date: Dec. 3, 2020

(65) Prior Publication Data
US 2021/0243932 A1 Aug. 12, 2021

(30) Foreign Application Priority Data
May 29, 2019 (CN) .......................... 201920791932.0

(51) Int. Cl.
*A01B 1/02* (2006.01)
*E01H 5/02* (2006.01)
(52) U.S. Cl.
CPC ............... *A01B 1/02* (2013.01); *E01H 5/02* (2013.01)

(58) Field of Classification Search
CPC .... A01B 1/00; A01B 1/02; A01D 1/00; B25G 3/00; E01H 5/02; F16B 7/0406; F16B 7/0413; F16B 2200/00; Y10T 403/00
See application file for complete search history.

(56) References Cited

U.S. PATENT DOCUMENTS

| 3,078,604 | A | * | 2/1963 | Neuman | .................. E01H 5/02 |
| | | | | | 294/54.5 |
| 3,100,665 | A | * | 8/1963 | Duppengiesser | ........ A01B 1/02 |
| | | | | | 294/57 |

(Continued)

FOREIGN PATENT DOCUMENTS

| CN | 2489928 Y | 5/2002 |
| CN | 2619761 Y | 6/2004 |
| CN | 103068533 B | 7/2015 |

*Primary Examiner* — Paul T Chin
(74) *Attorney, Agent, or Firm* — Zhihua Han

(57) ABSTRACT

A shovel handle connecting device includes a connecting assembly configured to connect a shovel handle and a shovel scoop. The connecting assembly includes a connecting seat embedded in the shovel scoop and a connecting member inserted and fixed in the connecting seat; a front end of the connecting member is provided with a connecting portion and a limiting portion, a limiting fastener is arranged on the connecting portion; the connecting seat is internally provided with a connecting groove allowing the connecting portion to be inserted therein, and an inner wall of the connecting groove is provided with a limiting groove allowing the limiting fastener to be snapped therein; an outer side wall of the limiting portion and an inner side wall of the connecting seat are formed into an accommodating cavity in an enclosure mode, and one end of the shovel handle is inserted and fixed in the accommodating cavity.

6 Claims, 3 Drawing Sheets

(56) References Cited

U.S. PATENT DOCUMENTS

| | | | | | |
|---|---|---|---|---|---|
| 5,310,230 | A | * | 5/1994 | Carmien | ............ B29C 66/8322 |
| | | | | | 294/49 |
| 5,664,820 | A | * | 9/1997 | Carmien | ................. A01B 1/02 |
| | | | | | 294/57 |
| 5,699,700 | A | * | 12/1997 | Carmien | ................. A01B 1/02 |
| | | | | | 29/525.12 |
| 6,220,639 | B1 | * | 4/2001 | Aquilina | ................. B25G 3/14 |
| | | | | | 294/57 |
| 8,337,372 | B1 | * | 12/2012 | Boterenbrood | .. A63B 23/03525 |
| | | | | | 482/139 |
| 10,058,990 | B1 | | 8/2018 | Logan | |
| 2004/0071496 | A1 | * | 4/2004 | Chun Yueh | ........... F16B 7/0406 |
| | | | | | 403/14 |
| 2004/0145198 | A1 | * | 7/2004 | Tomchak | ................. A01B 1/22 |
| | | | | | 294/57 |

\* cited by examiner

SHOVEL HANDLE CONNECTING DEVICE

FIELD

The present invention relates to the field of clearing tools, and in particular to a shovel handle connecting device.

BACKGROUND

A shovel is used as a tool for picking up or clearing material, a general shovel includes a shovel handle and a shovel scoop connected to the shovel handle, wherein the shovel handle is configured to be held and the shovel scoop is configured to pick up or clear material. For a common shovel in the market, generally, a shovel handle is fixedly connected to a shovel scoop through threaded fit connection. The above-mentioned mode has the following defects: after used for a long time, the shovel is prone to looseness and the connection is not stable enough.

SUMMARY

In order to overcome the defects in the prior art, the present invention provides a shovel handle connecting device in which the connection is stable and not prone to looseness.

To realize the objective, the present invention uses a technical solution as follows: a shovel handle connecting device includes a connecting assembly configured to connect a shovel handle and a shovel scoop, wherein the connecting assembly includes a connecting member and a connecting seat; a front end of the connecting member is provided with a connecting portion and a limiting portion, a limiting fastener is arranged on the connecting portion, and the connecting seat is embedded in the shovel scoop; the connecting seat is internally provided with a connecting groove allowing the connecting portion to be inserted therein, and an inner wall of the connecting groove is provided with a limiting groove allowing the limiting fastener to be snapped therein; the connecting member is inserted and fixed in the connecting seat; and one section of an outer side wall of the limiting portion and one section of an inner side wall of the connecting seat are formed into an accommodating cavity in an enclosure mode, and one end of the shovel handle is inserted and fixed in the accommodating cavity.

For using the shovel handle connecting device, firstly, the connecting seat is embedded in the shovel scoop in advance to form an integrally-formed structure with the shovel scoop. The connecting portion of the connecting member is inserted into the connecting groove of the connecting seat in an alignment mode, after the connecting portion is inserted into an exact position, the connecting member and the connecting seat are fixedly connected through the snap connection between the limiting fastener and the limiting groove, and after the connection, the limiting portion of the connecting member and the connecting groove of the connecting seat are formed into one section of the accommodating cavity at an inlet end, and the shovel handle is inserted into the accommodating cavity to realize the fixed connection between the shovel handle and the connecting member as well as the connecting seat. After the above-mentioned solution is used, the stable connection between the connecting member and the connecting seat is realized through the cooperation between the limiting fastener and the limiting groove, and therefore, the connection between the shovel handle and the shovel scoop is stable and is not prone to looseness.

As a further improvement, the limiting fastener is provided with a first oblique surface obliquely arranged from front to back; the limiting groove is externally provided with a second oblique surface matching the first oblique surface and configured to guide the limiting fastener to slide into the limiting groove; and the limiting groove is internally provided with a third oblique surface capable of being attached to the first oblique surface. After the above-mentioned solution is used, through the arrangement of the first oblique surface, when the connecting member is inserted into the connecting seat, the first oblique surface is pressed, the limiting fastener can be smoothly snapped into the limiting groove, and therefore, the insertion is convenient and easy to implement. Through the arrangement of the second oblique surface, the limiting fastener may be guided to slide into the limiting groove. Through the arrangement of the third oblique surface, the limiting fastener and the limiting groove may be in close fit to reduce the wear to the first oblique surface.

As a further improvement, the limiting fasteners are distributed in a spaced mode in an axial direction of the connecting member to form a zigzag snap, the limiting grooves are distributed in a spaced mode in an axial direction of the connecting seat to form a zigzag snap groove, and thus the connecting member and the connecting seat are fixedly connected by means of the meshing snap connection between the limiting fasteners and the limiting grooves. The zigzag design makes the connection between the connecting seat and the connecting member stabler and firmer.

As a further improvement, the shovel handle and the connecting member are fixedly connected through a rivet at an insertion position. By using the rivet for the fixation, a structure is simple and a cost is low, and after the fixation, the handle may be effectively prevented from deflecting around an axis in the use process.

As a further improvement, the limiting fastener is arranged at the bottom of the connecting portion, and the top of the connecting portion is provided with a reinforcing plate. Through the design of the reinforcing plate, the strength of the connecting portion is enhanced, and the shovel can bear a large external force in the use process.

As a further improvement, the top of the connecting seat uses a curved surface structure in which two ends are upwards tilted and a middle is horizontally dented. By using the above-mentioned structure, the connecting seat can be well embedded in the shovel scoop and will not be loosened in the use process.

DETAILED DESCRIPTION OF THE EMBODIMENTS

The present invention is further described in detail below in conjunction with the accompanying drawings and the embodiments.

Figure 1:
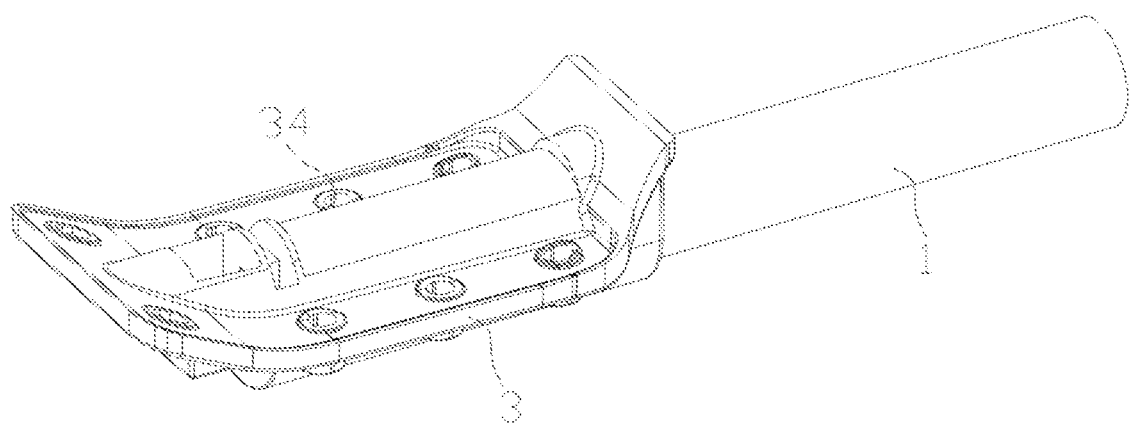
FIG. 1 is a stereogram of a shovel handle connecting device.
Figure 2:
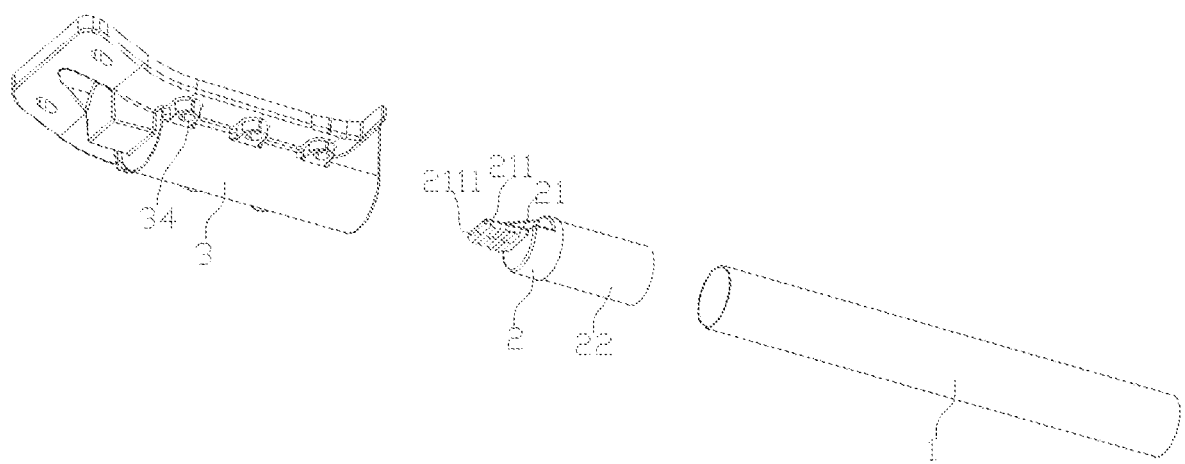
FIG. 2 is a schematic exploded diagram of the shovel handle connecting device.
Figure 3:
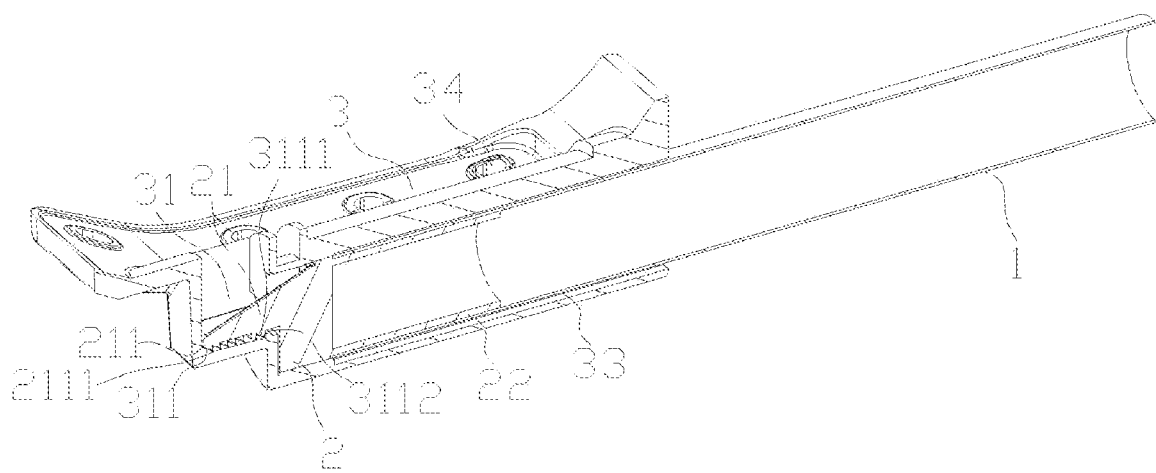
FIG. 3 is a section view of the shovel handle connecting device.
Figure 4:
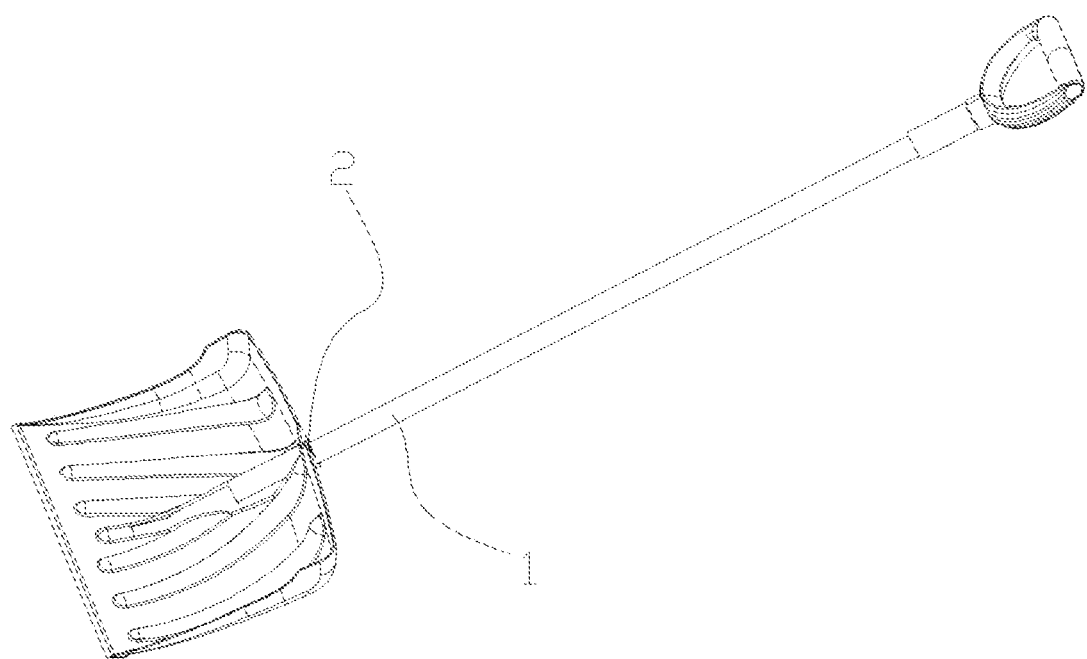
FIG. 4 is a stereogram after the shovel handle connecting device is connected to the shovel handle and the shovel scoop.

As show in FIGS. 1 to 4, a shovel handle connecting device includes a connecting assembly configured to connect a shovel handle 1 and a shovel scoop, wherein the connecting assembly includes a connecting member 2 and a connecting seat 3.

A front end of the connecting member 2 is provided with a connecting portion 21 and a limiting portion 22, limiting fasteners 211 are arranged on the connecting portion 21, the limiting fasteners 211 are provided with first oblique surfaces 2111 obliquely arranged from front to back, and the limiting fasteners 211 are distributed in a spaced mode in an axial direction of the connecting member 2 to form a zigzag snap. In order to enhance the strength of the connecting member and the connecting seat at a joint, in the present solution, the limiting fasteners 211 are arranged at the bottom of the connecting portion and the top of the connecting portion is provided with a reinforcing plate. By means of the reinforcing plate, the overall strength of the connecting portion is improved.

The connecting seat 3 is embedded in the shovel scoop, and in order to firmly arrange the connecting seat in the shovel scoop, the top of the connecting seat 3 is designed into a curved surface structure in which two ends are upwards tilted and a middle is horizontally dented. After the mode is used, when the shovel scoop is injection-molded, a contact area between the connecting seat and the shovel scoop can be expanded, and therefore, a finally formed product has a high strength. The connecting seat 3 is internally provided with a connecting groove 31 allowing the connecting portion 21 to be inserted therein, an inner wall of the connecting groove 31 is provided with limiting grooves 311 allowing the limiting fasteners 211 to be snapped therein, the limiting grooves 311 are externally provided with second oblique surfaces 3112 matching the first oblique surfaces 2111 and configured to guide the limiting fasteners 211 to slide into the limiting grooves 311, and the limiting grooves 311 are internally provided with third oblique surfaces 3111 capable of being attached to the first oblique surfaces 2111. The limiting grooves 311 are distributed in a spaced mode in an axial direction of the connecting seat 3 to form a zigzag snap groove.

The connecting member 2 is inserted and fixed in the connecting seat 3, and the connecting member 2 and the connecting seat 3 are fixedly connected by means of the meshing snap connection between the limiting fasteners 211 and the limiting grooves 311. One section of an outer side wall of the limiting portion 22 and one section of an inner side wall of the connecting seat are formed into an accommodating cavity 33 in an enclosure mode, and one end of the shovel handle in inserted and fixed in the accommodating cavity 33. The shovel handle 1 and the connecting member 2 are fixedly connected through a rivet at an insertion position.

What is claimed is:

1. A shovel handle connecting device, comprising a connecting assembly configured to connect a shovel handle (1) and a shovel scoop, wherein the connecting assembly comprises a connecting member (2) and a connecting seat (3); a front end of the connecting member (2) is provided with a connecting portion (21) and a limiting portion (22), a limiting fastener (211) is arranged on the connecting portion (21), and the connecting seat (3) is embedded in the shovel scoop; the connecting seat (3) is internally provided with a connecting groove (31) allowing the connecting portion (21) to be inserted therein, and an inner wall of the connecting groove (31) is provided with a limiting groove (311) allowing the limiting fastener (211) to be snapped therein; the connecting member (2) is inserted and fixed in the connecting seat (3); and one section of an outer side wall of the limiting portion (22) and one section of an inner side wall of the connecting seat are formed into an accommodating cavity (33) in an enclosure mode, and one end of the shovel handle is insertable in the accommodating cavity (33) so as to fix the shovel handle and the connecting seat 3 together.

2. The shovel handle connecting device according to claim 1, wherein the limiting fastener (211) is provided with a first oblique surface (2111) obliquely arranged from front to back; the limiting groove (311) is externally provided with a second oblique surface (3112) matching the first oblique surface (2111) and configured to guide the limiting fastener (211) to slide into the limiting groove (311); and the limiting groove (311) is internally provided with a third oblique surface (3111) capable of being attached to the first oblique surface (2111).

3. The shovel handle connecting device according to claim 2, wherein the limiting fasteners (211) are distributed in a spaced mode in an axial direction of the connecting member (2) to form a zigzag snap, the limiting grooves (311) are distributed in a spaced mode in an axial direction of the connecting seat (3) to form a zigzag snap groove, and thus the connecting member (2) and the connecting seat (3) are fixedly connected by means of the meshing snap connection between the limiting fasteners (211) and the limiting grooves (311).

4. The shovel handle connecting device according to claim 1, wherein the shovel handle (1) and the connecting member (2) are fixedly connected through a rivet at an insertion position.

5. The shovel handle connecting device according to claim 1, wherein the limiting fastener (211) is arranged at the bottom of the connecting portion, and the top of the connecting portion is provided with a reinforcing plate.

6. The shovel handle connecting device according to claim 1, wherein the top of the connecting seat uses a curved surface structure in which two ends are upwards tilted and a middle is horizontally dented.

* * * * *